(12) United States Patent
Jeong

(10) Patent No.: US 10,981,430 B2
(45) Date of Patent: Apr. 20, 2021

(54) ROOF-TYPE AIR CONDITIONER FOR VEHICLES AND METHOD OF CONTROLLING THE SAME

(71) Applicants: Hyundai Motor Company, Seoul (KR); Kia Motors Corporation, Seoul (KR)

(72) Inventor: Seong-Bin Jeong, Hwaseong-si (KR)

(73) Assignees: Hyundai Mortor Company, Seoul (KR); Kia Motors Corporation, Seoul (KR)

( * ) Notice: Subject to any disclaimer, the term of this patent is extended or adjusted under 35 U.S.C. 154(b) by 181 days.

(21) Appl. No.: 16/213,768

(22) Filed: Dec. 7, 2018

(65) Prior Publication Data

US 2019/0351731 A1 Nov. 21, 2019

(30) Foreign Application Priority Data

May 16, 2018 (KR) .......................... 10-2018-0056149

(51) Int. Cl.
*B60H 1/00* (2006.01)
*B60H 1/32* (2006.01)

(52) U.S. Cl.
CPC ....... *B60H 1/00028* (2013.01); *B60H 1/0055* (2013.01); *B60H 1/00357* (2013.01); *B60H 1/00828* (2013.01); *B60H 1/00485* (2013.01); *B60H 1/3208* (2013.01); *B60H 2001/002* (2013.01); *B60H 2001/00092* (2013.01); *B60H 2001/00235* (2013.01)

(58) Field of Classification Search
CPC .......... B60H 2001/002; B60H 1/00357; B60H 1/0055; B60H 1/00828; B60H 1/00485; B60H 1/3208
See application file for complete search history.

(56) References Cited

U.S. PATENT DOCUMENTS

| | | | | |
|---|---|---|---|---|
| 6,257,013 | B1 * | 7/2001 | Murray ................ | B60H 1/3229 62/302 |
| 6,606,875 | B1 * | 8/2003 | Grand ................ | B60H 1/00014 62/239 |
| 2012/0276832 | A1 * | 11/2012 | Quaak ................ | B60H 1/00014 454/91 |
| 2019/0315190 | A1 * | 10/2019 | Draheim ............ | B60H 1/00014 |
| 2019/0375274 | A1 * | 12/2019 | Jonsson ............... | B60K 11/085 |
| 2020/0338960 | A1 * | 10/2020 | Barin .................... | B60H 1/2209 |

FOREIGN PATENT DOCUMENTS

| | | | | |
|---|---|---|---|---|
| CN | 107009847 A | * | 8/2017 | |
| JP | 58199214 A | * | 11/1983 | ............... B60H 1/32 |
| JP | 2004231156 A | * | 8/2004 | ......... B60H 1/00857 |
| KR | 2002-0068796 A | | 8/2002 | |
| WO | WO-03022611 A1 | * | 3/2003 | ............. B60H 1/345 |

* cited by examiner

*Primary Examiner* — Nelson J Nieves
(74) *Attorney, Agent, or Firm* — Morgan, Lewis & Bockius LLP

(57) ABSTRACT

A roof-type air conditioner for vehicles may include an evaporator to discharge cold air to the internal of a vehicle, and a conveying unit to move the evaporator in a longitudinal direction of the vehicle on a ceiling of the vehicle such that the evaporator is disposed to the ceiling of the internal of the vehicle and positioned to a region required for cooling.

11 Claims, 16 Drawing Sheets

ROOF-TYPE AIR CONDITIONER FOR VEHICLES AND METHOD OF CONTROLLING THE SAME

CROSS-REFERENCE TO RELATED APPLICATIONS

The present application claims priority to Korean Patent Application No. 10-2018-0056149, filed on May 16, 2018, the entire contents of which is incorporated herein for all purposes by this reference.

BACKGROUND OF THE INVENTION

Field of the Invention

The present invention relates to an air conditioner used to cool the interior of a vehicle, and more particularly, to a roof-type air conditioner for vehicles, which is capable of adjusting a cooling region by moving the roof-type air conditioner disposed to a roof of a vehicle in a longitudinal direction of the vehicle according to a seat direction and a riding position, and a method of controlling the same.

Description of Related Art

A vehicle is provided with a heating, ventilating, and air conditioning (HVAC) system that enables passengers to feel pleasant air in the internal of the vehicle.

There are typically a variety of devices for the present HVAC system, in which a condenser and a compressor for an air conditioner used for cooling are positioned in an engine compartment of the vehicle and an evaporator is positioned in a cockpit module of the vehicle. During cooling, a refrigerant is phase-changed while circulating by the operation of the compressor and cools the internal of the vehicle through the evaporator with low temperature.

However, the above conventional HVAC system has the following problems.

Firstly, low-temperature condensate generated during cooling is not recycled since the condensate is discharged as it is. The evaporator generate condensate by condensing moisture contained in ambient air because the surface thereof has a low temperature, and the present low-temperature condensate is discharged, as it is, to the floor of the vehicle without recycling in the vehicle.

Secondly, it is inconvenient to clean the evaporator, the duct, and the like since they are disposed in the vehicle, especially the cockpit module. Moisture remains in the evaporator, the duct, and the like when the air conditioner is turned off, which propagates mold and bacteria to cause odors. To clean the evaporator, the duct, and the like, a dashboard panel or the like may first be removed. Thus, it is impossible to clean them except for special technicians and it is difficult to completely clean them even when the dashboard panel or the like is removed.

Thirdly, there is a problem in that a cooling load is excessively increased because the whole internal of the vehicle is cooled irrespectively of the number of passengers or the positions of passengers. The conventional HVAC system controls the entire region of the internal to be cooled, but in fact there are many situations where a full complement of passengers does not get in the vehicle. For example, a cooling load may be increased since, even when a driver alone get in the vehicle or passengers are seated only in a first row of seats, cooling may be performed on subsequent second or more rows of seats.

Moreover, there is a problem in that air circulation is blocked when a first row of seats rotates since an air vent is located only in the front of the vehicle internal such as in a dashboard. If an autonomous vehicle will be common, it may travel in the state in which passengers in a first row of seats face passengers in a second row of seats by rotating the first row of seats rearward thereof. In the instant case, the air conditioning performance of the vehicle internal may be reduced since the air discharged from the air vent of the dashboard is not smoothly circulated due to the rotated first row of seats. Hence, if the autonomous vehicle is common, cooling performance is degraded due to resistance against the circulation of cold air when the first row of seats is rotated.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a roof-type air conditioner for vehicles, in which an evaporator is configured to be slildable in a longitudinal direction of a vehicle such that the evaporator is positioned according to a cooling region in a roof of the vehicle, and a method of controlling the same.

Various aspects of the present invention are directed to providing a roof-type air conditioner for vehicles, which is configured for efficiently cooling the internal of a vehicle according to the position of a passenger and the direction of rotation of a seat, and a method of controlling the same.

Various aspects of the present invention are directed to providing a roof-type air conditioner for vehicles, which is configured for reducing the power required for a compressor while increasing heat exchange efficiency of a condenser by utilizing low-temperature condensate to cool the condenser, and a method of controlling the same.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a roof-type air conditioner for vehicles may include an evaporator to discharge cold air to the internal of a vehicle, and a conveying unit to move the evaporator in a longitudinal direction of the vehicle on a ceiling of the vehicle such that the evaporator is disposed to the ceiling of the internal of the vehicle and positioned to a region required for cooling.

The conveying unit may include a frame having rails disposed in the longitudinal direction of the vehicle, a drive motor, a plate configured to be movable in the longitudinal direction of the vehicle on the rails, the evaporator being mounted on the plate, and a conveying means for sliding the plate by operation of the drive motor.

The conveying means may include a drive gear rotated by the drive motor, and a wire, one end portion of which is connected to the plate while the other end portion thereof is engaged to the drive gear.

The rails of the frame may be spaced from each other to face each other, the frame may have a connection portion connecting end portions of the rails, and the drive motor may be disposed to the connection portion.

The rails and the connection portion may be provided with a guide pipe to guide bending of the wire while the wire passes in the guide pipe.

A housing may be disposed on the plate to accommodate the evaporator, and a blower fan may be disposed in the housing to blow cold air into the vehicle.

A front vent may be disposed to the front of the housing to guide the cold air forward of the internal of the vehicle, a rear vent may be disposed to the rear of the housing to guide the cold air rearward of the internal of the vehicle, and a lower vent may be disposed at an installation portion of the evaporator on the plate to guide the cold air downward of the evaporator.

The lower vent may be disposed to a lower cover detachably disposed to a through-hole formed in the plate.

The roof-type air conditioner may further include an expansion pipe disposed on an associated one of the rails to connect the evaporation to a compressor and a condenser, the expansion pipe being configured such that its length is expanded or contracted in a telescopic manner according to the movement of the evaporator while a refrigerant flows into the expansion pipe.

A condensate collection plate may be disposed under the evaporator to collect condensate generated from the evaporator and guide it to an associated one of the rails.

The condensate collection plate may have a net shape so that air is blown through the condensate collection plate.

A condensate pipe may be provided between a front end portion of the rail and an upper end portion of a condenser to guide the condensate, collected from the condensate collection plate, upward from the condenser.

In accordance with various exemplary embodiments of the present invention, a method of controlling a roof-type air conditioner for vehicles, in which an evaporator is disposed to an internal ceiling of a vehicle to be movable in a longitudinal direction of the vehicle and is moved and positioned to a region required for cooling, may include determining whether a passenger requests operation of an air conditioner, and operating the air conditioner to move the evaporator according to a passenger's position and a seat direction and vary a blown region to cool the internal of the vehicle, when the operation of the air conditioner is requested.

The method may further include, after the determining whether a passenger requests operation of an air conditioner, determining whether a passenger is seated in a second row of seats of the vehicle, and determining whether a first row of seats of the vehicle is rotated rearward of the vehicle.

The operating the air conditioner may include completely moving the evaporator forward to cool the front of the first row of seats directed forward of the vehicle, moving the evaporator rearward of the vehicle from the front of the vehicle by a fixed distance to perform cooling from a front end portion of the internal of the vehicle to a center portion of the internal of the vehicle, and moving the evaporator to the center of the internal of the vehicle to cool the entire internal of the vehicle, and a selected one of the completely moving the evaporator forward, the moving the evaporator rearward of the vehicle, and the moving the evaporator to the center of the internal of the vehicle may be performed according to the determining whether a passenger is accommodated in a second row of seats of the vehicle or the determining whether a first row of seats of the vehicle is rotated rearward of the vehicle.

When it is determined that no passenger is seated in the second row of seats and the first row of seats is directed forward, the completely moving the evaporator forward may be performed.

When it is determined that no passenger is seated in the second row of seats and the first row of seats is directed rearward thereof, the moving the evaporator rearward of the vehicle may be performed.

When it is determined that a passenger is seated in the second row of seats, the moving the evaporator to the center of the internal of the vehicle may be performed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
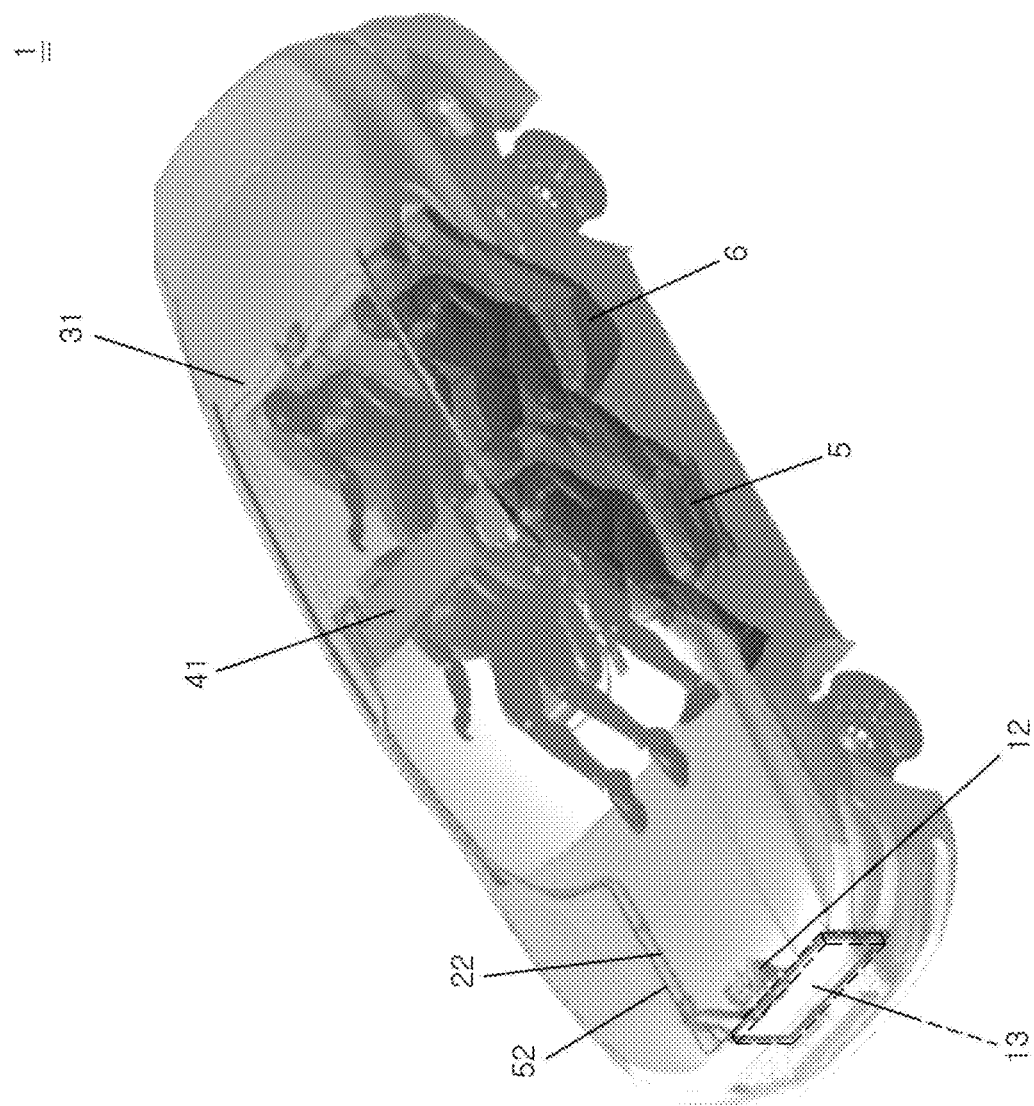
FIG. 1 is a perspective view exemplarily illustrating a state in which a roof-type air conditioner for vehicles according to an exemplary embodiment of the present invention is disposed in a vehicle.
Figure 2:
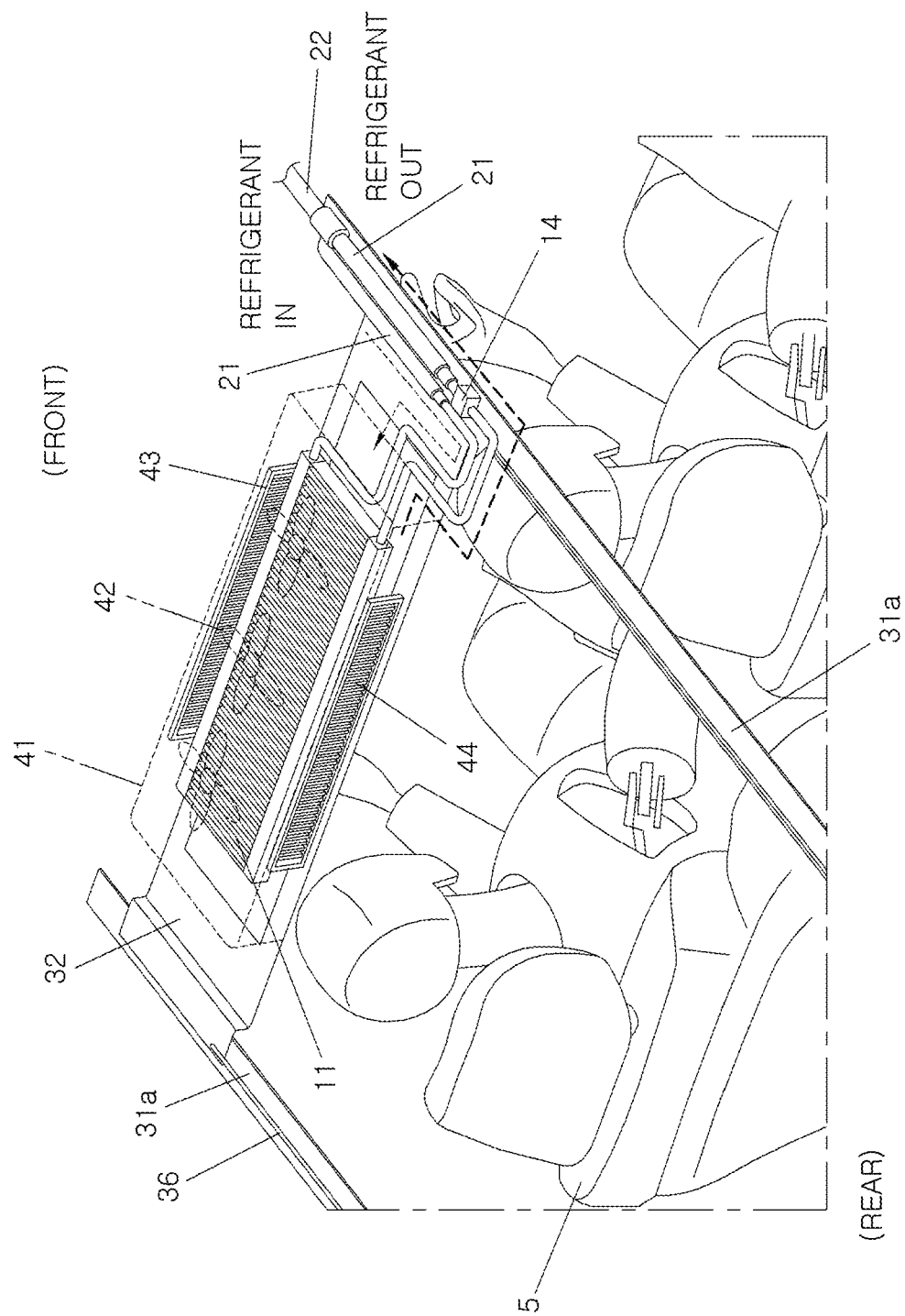
FIG. 2 is an enlarged perspective view exemplarily illustrating the installation of the roof-type air conditioner for vehicles according to the exemplary embodiment of the present invention in the vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a roof-type air conditioner for vehicles and a method of controlling the same according to an exemplary embodiment of the present invention will be described in detail with reference to the accompanying drawings.

A roof-type air conditioner for vehicles according to an exemplary embodiment of the present invention is characterized in that an evaporator 11 is disposed to an internal ceiling of a vehicle 1 to discharge cold air and the cold air is intensively supplied to a region intended for cooling by moving the evaporator 11 in the longitudinal direction of the vehicle.

The air conditioner cools the internal of the vehicle 1 by circulating a refrigerant in the state in which the evaporator 11 is connected to a compressor 12, a condenser 13, and an expansion valve 14 through a refrigerant pipe.

The evaporator 11 positioned in the internal of the vehicle 1 moves in the longitudinal direction of the vehicle 1 by a conveying unit in the state in which the compressor 12 and the condenser 13 are disposed in an engine compartment of the vehicle 1, to discharge cold air to the region required for cooling, increasing the efficiency of the air conditioner and improving internal comfort.

Figure 3:
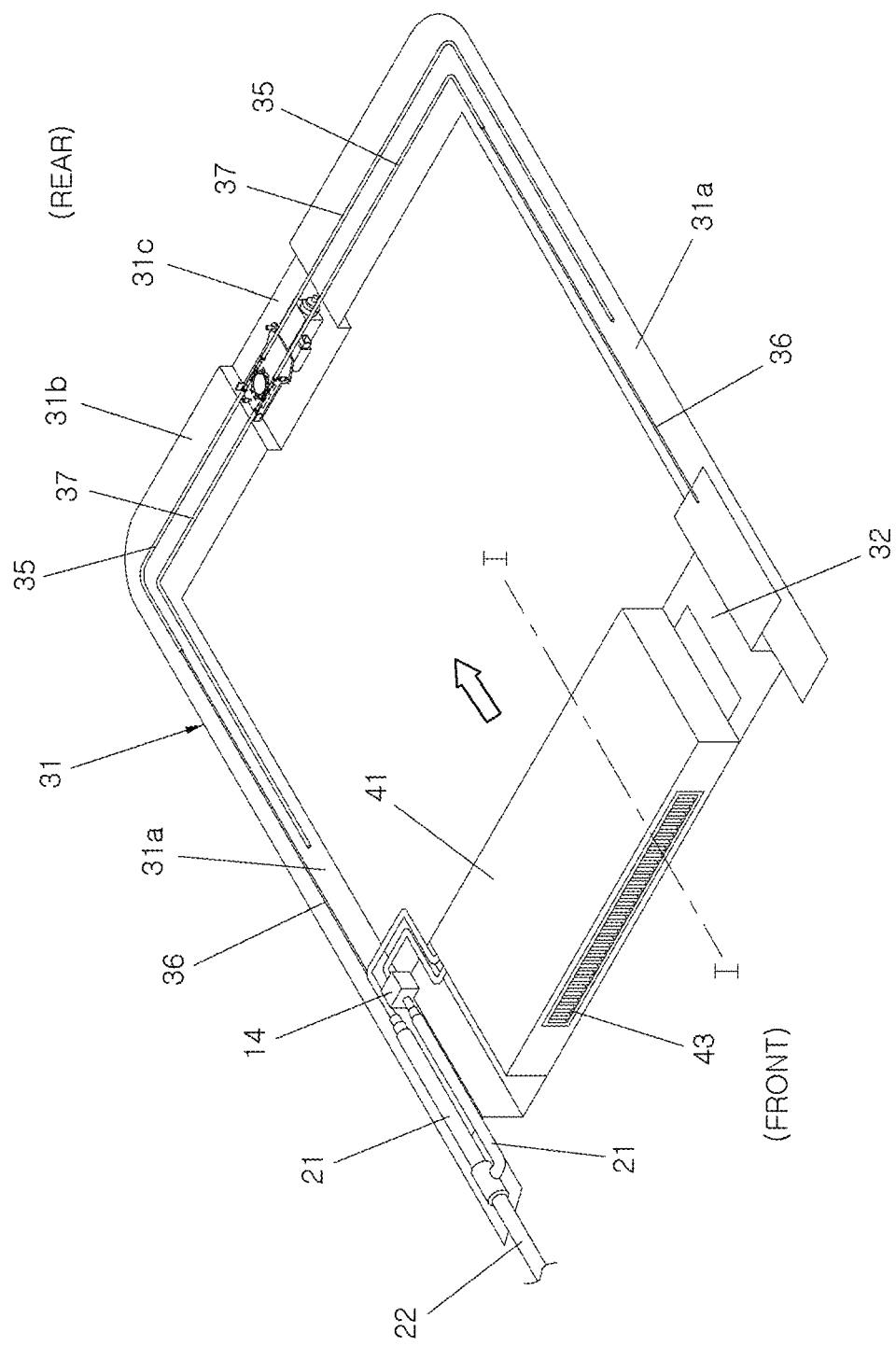
FIG. 3 is a perspective view exemplarily illustrating a conveying unit in the roof-type air conditioner for vehicles according to the exemplary embodiment of the present invention.
Figure 4:
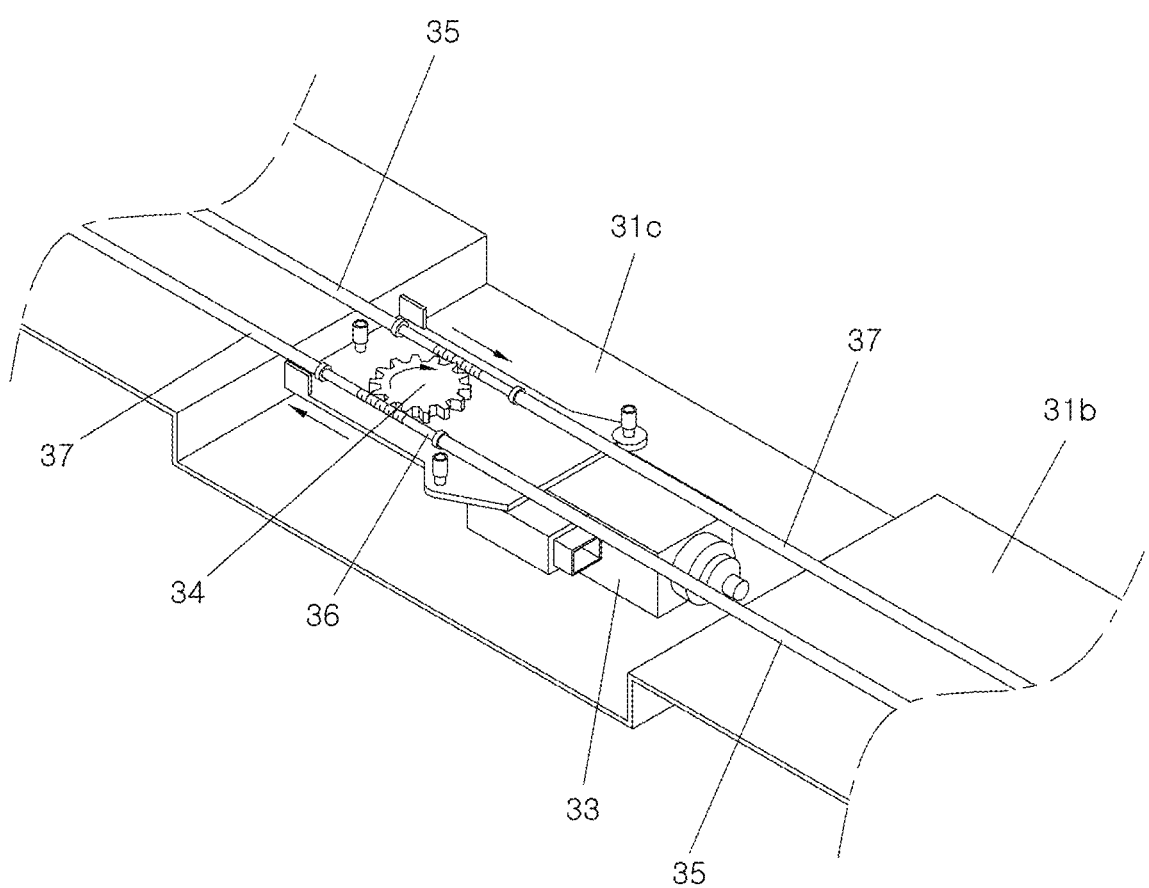
FIG. 4 is an enlarged perspective view exemplarily illustrating main components of the conveying unit in the roof-type air conditioner for vehicles according to the exemplary embodiment of the present invention.

The conveying unit conveys the evaporator 11 in the longitudinal direction of the vehicle 1 in the internal of the vehicle 1. The configuration of the conveying unit will be described in detail. As illustrated in FIG. 3 and FIG. 4, the conveying unit may include a frame 31 having rails 31a formed in the longitudinal direction of the vehicle 1 and mounted on the ceiling of the vehicle, a plate 32 configured to be movable in the longitudinal direction of the vehicle 1 on the rails 31a, wherein the evaporator 11 is disposed on the plate 32, and a conveying means for sliding the plate 32.

The frame 31 is disposed in the longitudinal direction of the vehicle 1. The rails 31a are respectively formed in parallel with each other at both end portions of the roof of the vehicle 1, and the frame 31 includes a connection portion 31b that interconnects the end portions of the respective rails 31a. For example, the frame 31 may have a U-shape which is open at the front thereof. The frame 31 has a motor seating portion 31c which is concavely formed in the middle of the connection portion 31b for installation of a drive motor 33.

In an exemplary embodiment of the present invention, the drive motor 33 is connected to a controller such as engine control unit (ECU) to control the drive motor 33.

The plate 32 is movably disposed, at both end portions thereof, to the rails 31a, and the evaporator 11 is mounted to the plate 32. Although both end portions of the plate 32 are illustrated as coming into surface-contact with the rails 31a so that the plate 32 slides, rollers may be respectively disposed to both end portions of the plate 32 as occasion demands.

The conveying means is configured to vary the position of the evaporator 11 by allowing the drive motor 33 mounted to the frame 31 to slide the plate 32 in the longitudinal direction of the vehicle 1. The conveying means includes a drive gear 34 rotated by the drive motor 33, and a wire 36, one end portion of which is connected to one side of the plate 32 while the other end portion thereof is engaged to the drive gear 34.

The drive gear 34 is rotated by the drive motor 33 connected thereto. The drive gear 34 moves the plate 32 according to the direction of rotation thereof in the forward or rearward direction of the vehicle 1.

One end portion of the wire 36 is fixed to the plate 32 and the other end portion thereof is engaged to the drive gear 34. When the wire 36 is pulled by the drive gear 34, the plate 32 moves rearward thereof. The wire 36 may exhibit certain strength, and the plate 32 may thus move forward by the wire 36. This is the same principle as the wire applied to move glass in the sunroof of the vehicle. The other end portion of the wire 36 has teeth for engagement with the drive gear 34.

The wire 36 includes a pair of wires respectively connected to both end portions of the plate 32.

The frame 31 has a guide pipe 35 to guide the movement of the wire 36. The guide pipe 35 is disposed to a bent portion of the frame, for example around a bonding portion of the rails 31a and the connection portion 31b, to easily switch the direction of the wire 36.

The frame 31 may have an auxiliary pipe 37 to accommodate the wire 36 having passed through the drive gear 34.

When the drive gear 34 is rotated in a direction indicated by the arrow of FIG. 4 by the rotation of the drive motor 33, the drive gear 34 pulls the wire 36 so that the plate 32 move rearward of the vehicle 1 (in a direction indicated by the arrow of FIG. 3) to move the evaporator 11 in the rearward direction of the vehicle. In the instant case, the direction of the wire 36 is easily switched by the guide pipe 35, and the wire 36 having passed through the drive gear 34 is accommodated in the auxiliary pipe 37. On the other hand, when the drive motor 33 is rotated in an opposite direction thereof, the evaporator 11 moves forward thereof.

The refrigerant circulating through the evaporator 11 has to be circulated through a refrigerant circuit. To the present end, a refrigerant is introduced into the evaporator 11 so as correspond to the forward and rearward movement of the evaporator 11, or an expansion pipe 21 is applied to discharge a refrigerant from the evaporator 11. The expansion pipe 21 has a length varying toward the introduction or discharge of refrigerant to or from the evaporator 11.

Figure 5:
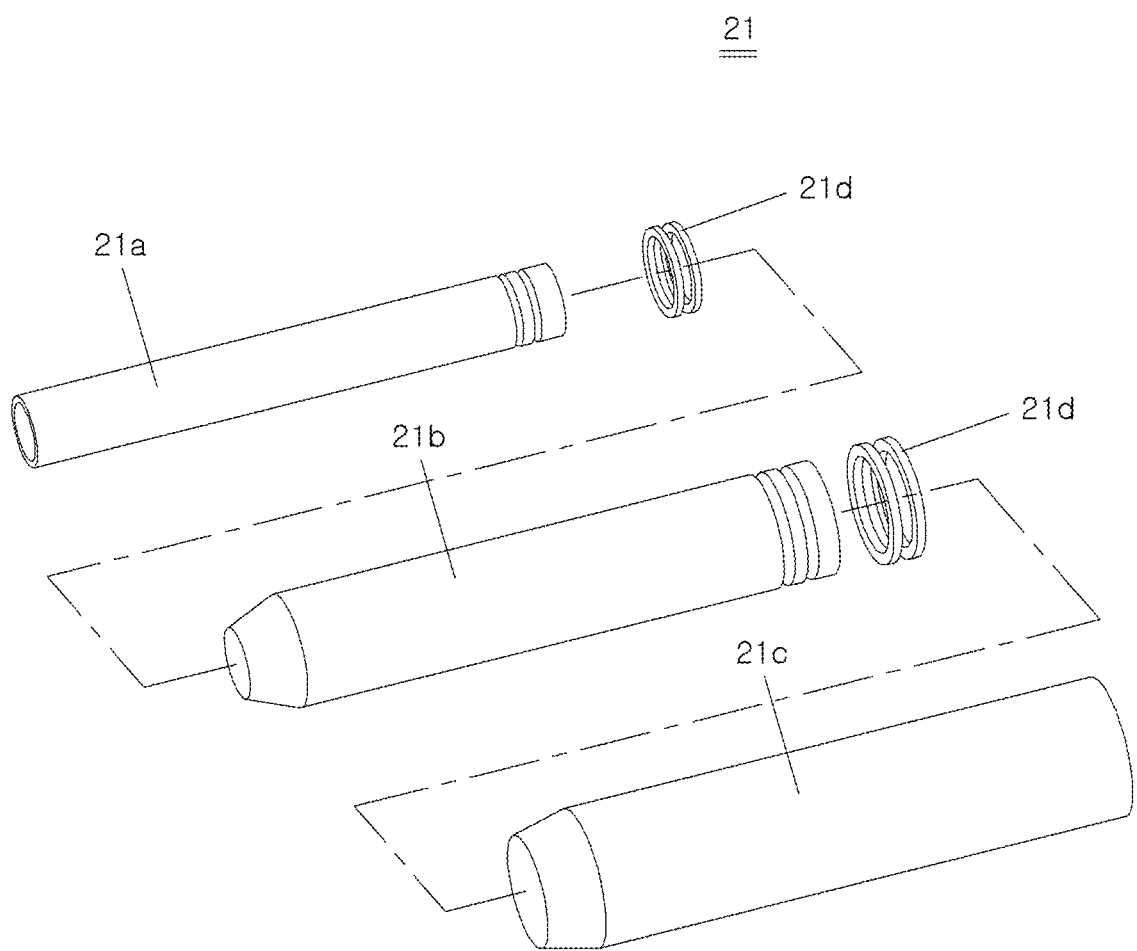
FIG. 5 is an exploded perspective view exemplarily illustrating an expansion pipe in the roof-type air conditioner for vehicles according to the exemplary embodiment of the present invention.
Figure 6:
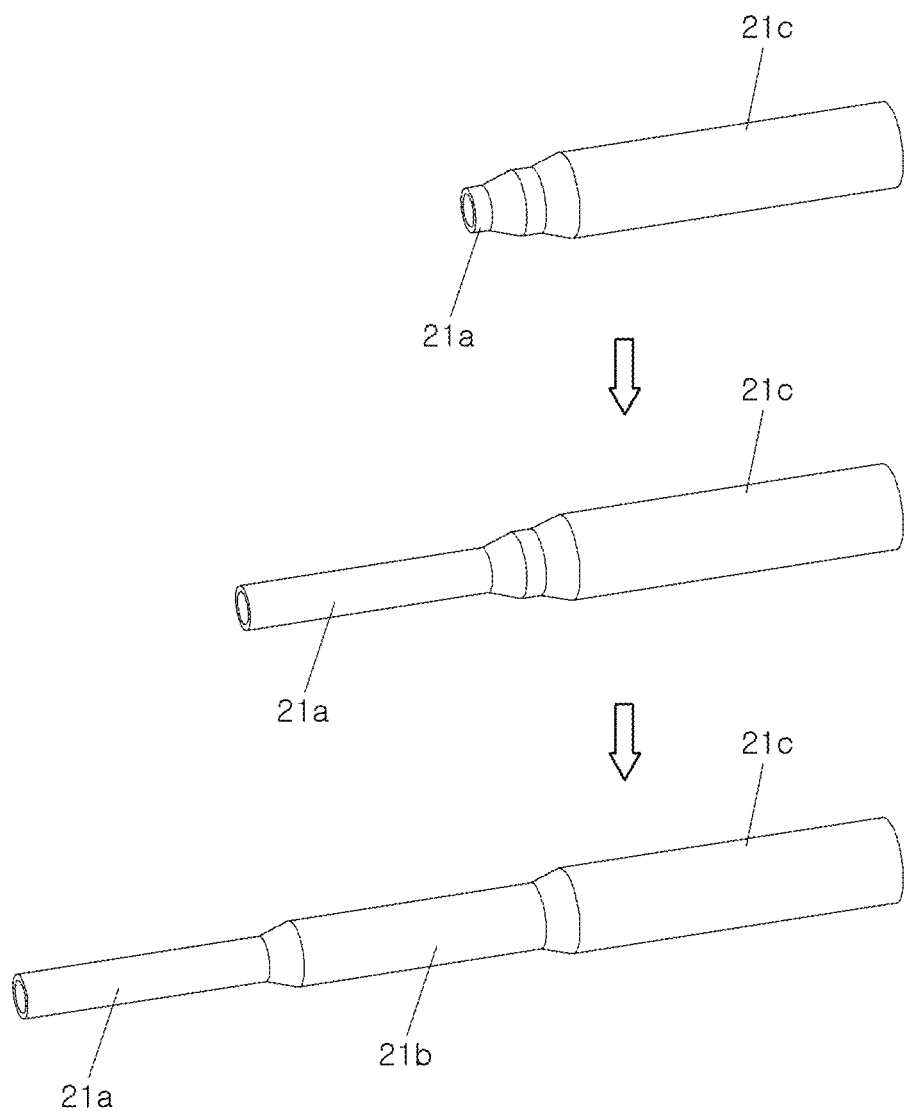
FIG. 6 is a perspective view exemplarily illustrating an expansion and contraction state of the expansion pipe in the roof-type air conditioner for vehicles according to the exemplary embodiment of the present invention.

The expansion pipe 21 is expanded or contracted in a telescopic manner so that the length thereof is variable. For example, as illustrated in FIG. 5 and FIG. 6, the expansion pipe 21 includes a first pipe 21a having the smallest internal diameter and second and third pipes 21b and 21c having an internal diameter gradually increasing from that of the first pipe 21a, and prevents a leakage of refrigerant by an O-ring 21d inserted between the pipes adjacent to each other. The expansion pipe 21 has the smallest length in the state in which all of the first, second, and third pipes 21a, 21b, and 21c are accommodated therein, the length of the expansion pipe 21 is increased when a portion of the first or second pipe 21a or 21b is withdrawn, and the length of the expansion pipe 21 is maximum when both of the first and second pipes 21a and 21b are withdrawn.

Meanwhile, although the expansion pipe 21 is illustrated as including the first to third pipes 21a to 21c, the number of pipes may also be larger or smaller as occasion demands.

Figure 10:
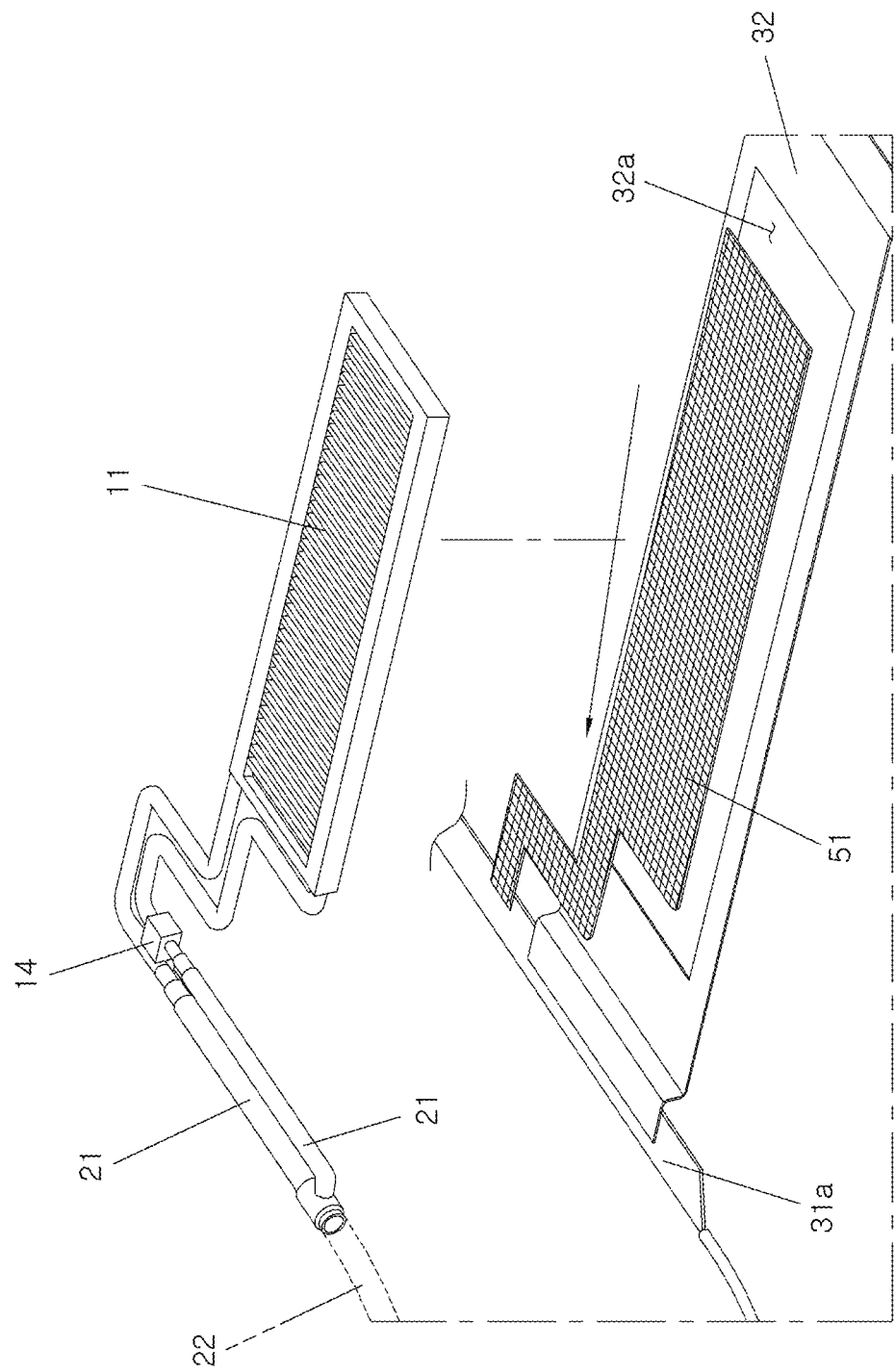
FIG. 10 is an exploded perspective view a state illustrating a condensate collection plate is disposed to the roof-type air conditioner for vehicles according to the exemplary embodiment of the present invention.
Figure 11:
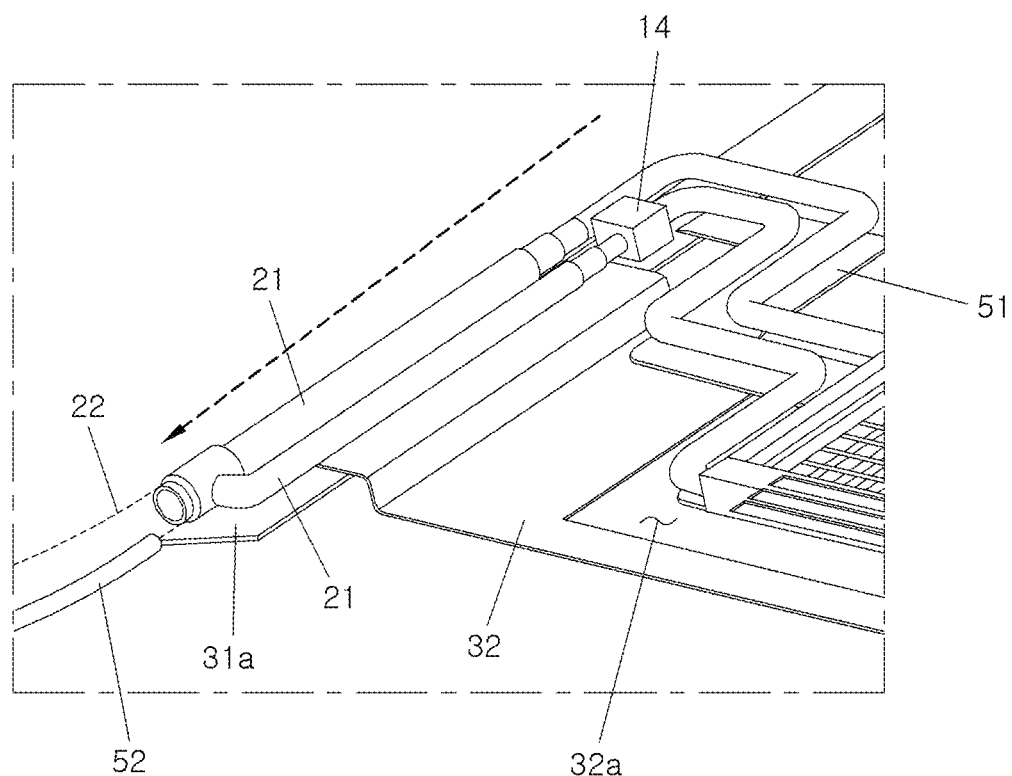
FIG. 11 is an enlarged view exemplarily illustrating the main portion of FIG. 10.

A double refrigerant pipe 22, which is disposed in the roof and A-pillar of the vehicle, is disposed to the end portion of the expansion pipe 21 such that the evaporator 11 is connected to the compressor 12 and the condenser 13 for circulation of refrigerant. The refrigerant pipe 22 is configured in a form of a double pipe at its partial section, facilitating a refrigerant to bilaterally circulate in the single refrigerant pipe 22. That is, the refrigerant pipe 22 is illustrated as being merged to two expansion pipes 21 in FIGS. 3, 10, and 11, which means that the two expansion pipes 21 are connected to the respective inside and outside of the double pipe. The refrigerant pipe 22 is connected to the condenser 13 and the compressor 12 in the engine compartment.

Figure 7:
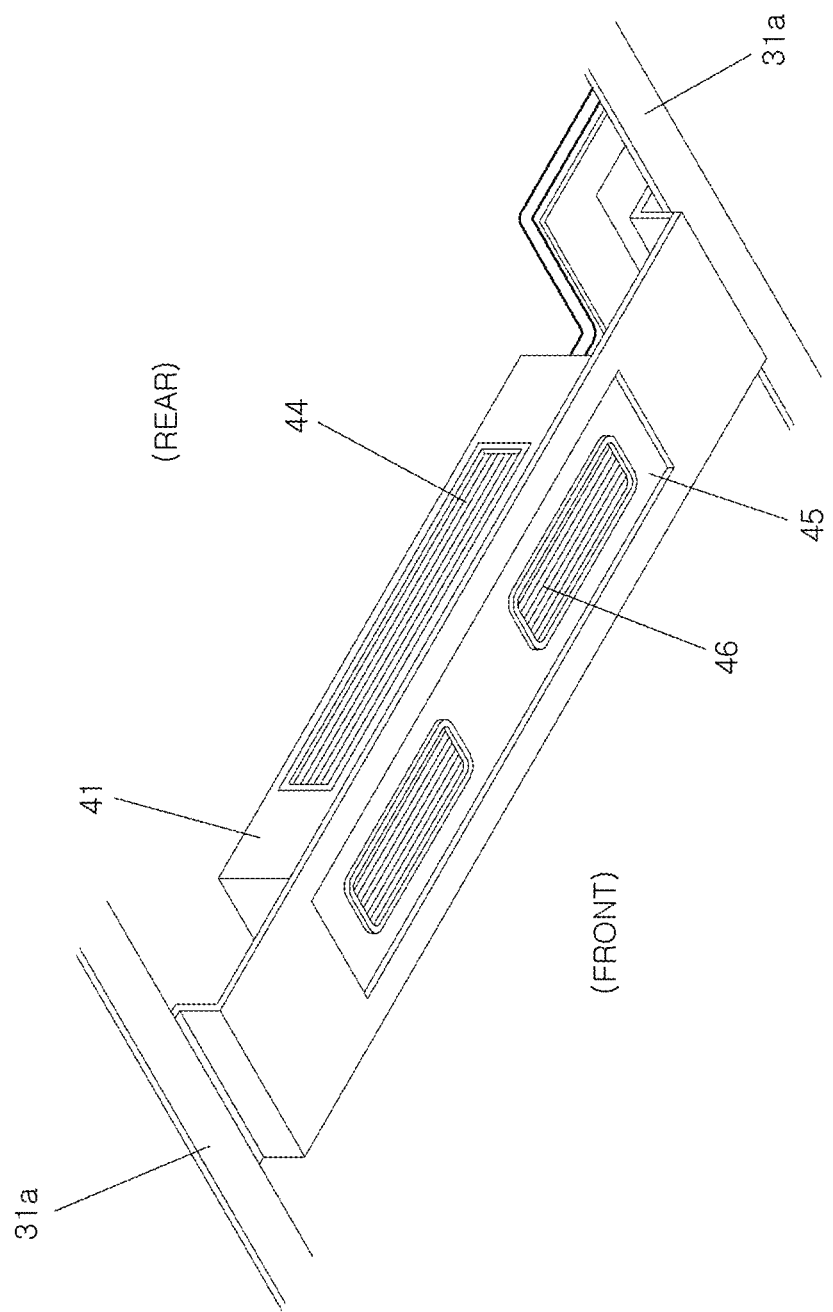
FIG. 7 is a perspective view the bottom portion of the roof-type air conditioner for vehicles according to the exemplary embodiment of the present invention.
Figure 8:
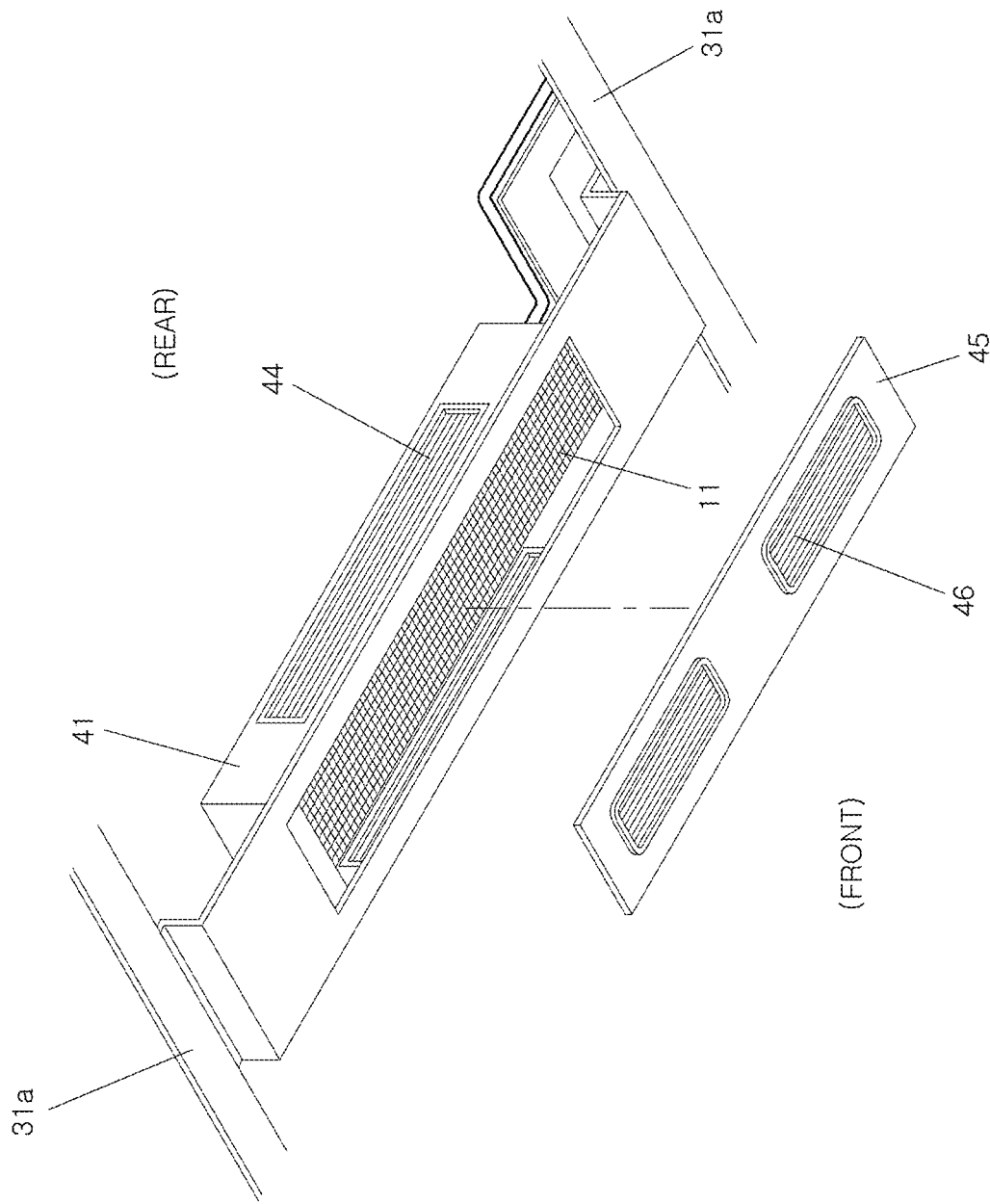
FIG. 8 is a bottom perspective view exemplarily illustrating a state in which a cover is removed from the roof-type air conditioner for vehicles according to the exemplary embodiment of the present invention.
Figure 9:
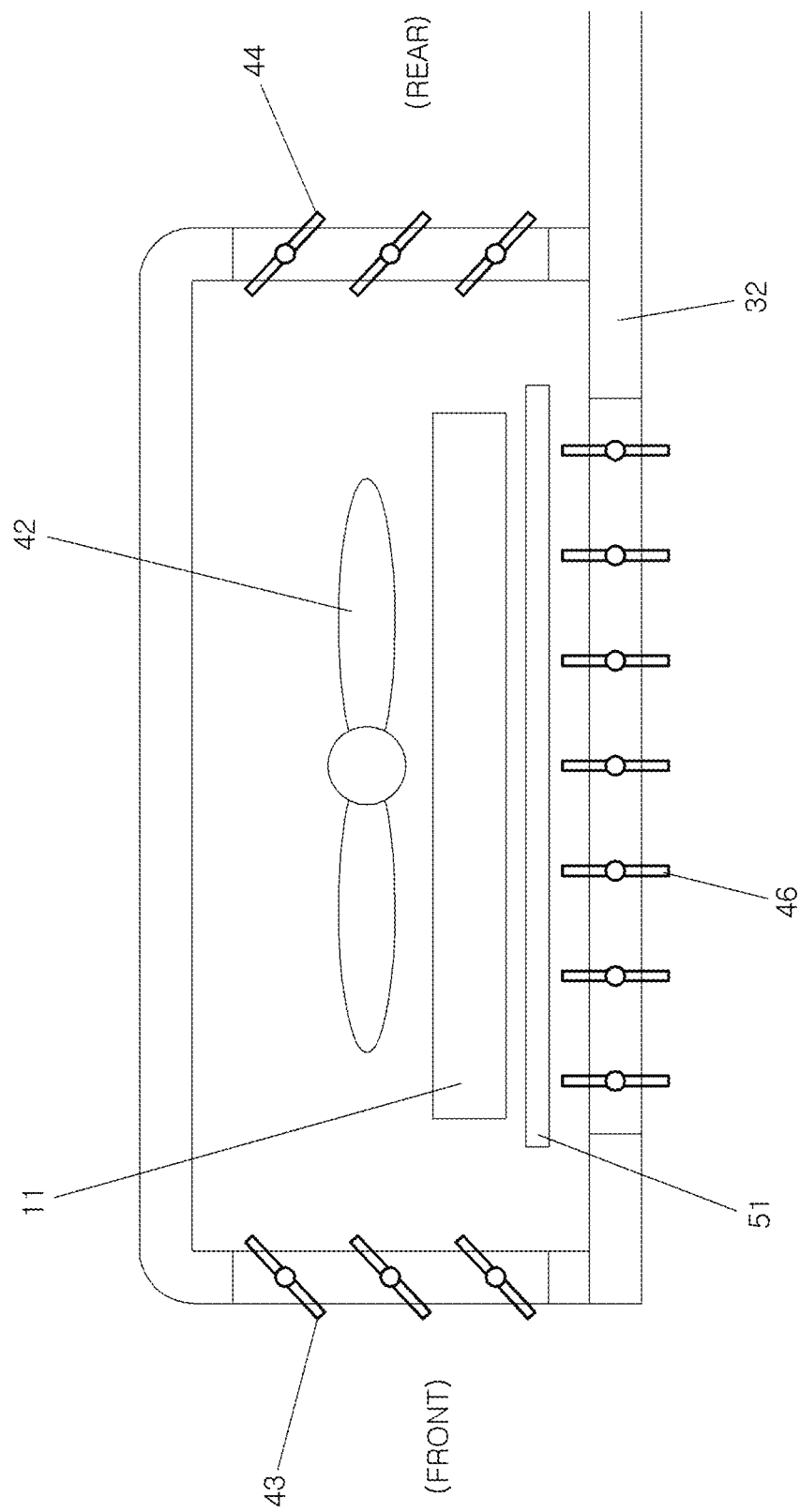
FIG. 9 is a cross-sectional view taken along line I-I of FIG. 3.

FIG. 7, FIG. 8 and FIG. 9 illustrate a structure in which cold air is supplied to the internal of the vehicle 1.

The evaporator 11 is disposed on the plate 32 serving to protect the evaporate 11, and there is provided a housing 41 for protecting other components. The box-shaped housing 41 is disposed on the plate 32 so that the evaporator 11 is disposed in the housing 41.

A blower fan 42 is disposed over the evaporator 11 in the housing 41 to supply cold air in a directly downward direction from the evaporator 11.

The housing 41 has vents 43, 44, and 46 for guiding the circulation of cold air in the internal of the vehicle 1. The housing 41 has front and rear vents 43 and 44 disposed to the respective front and rear surfaces thereof, facilitating the circulation direction of cold air to be controlled according to the angles of the front and rear vents 43 and 44. The plate 32 has a through-hole 32a formed in an installation portion of the evaporator 11, lower vents 46 are disposed in the through-hole 32a to control the circulation direction of the cold air discharged in the directly downward direction from the evaporator 11. In the instant case, the lower vents 46 are disposed on a lower cover 45 which is detachably mounted to the plate 32, to clean the evaporator 11 in the state in which the lower cover 45 is removed (see FIG. 8). Thus, it is possible to resolve a problem which is substantially impossible to clean the evaporator since the evaporator is disposed in the cockpit module.

All of the front, rear, and lower vents 43, 44, and 46 may be configured to be individually adjustable according to a cooling mode.

A condensate collection plate 51 is disposed under the evaporator 11. Condensate is condensed on the surface of the evaporator 11 by the operation of the air conditioner. To collect the present condensate, the condensate collection plate 51 is disposed under the evaporator 11. The condensate collection plate 51 has a larger area than the evaporator 11, and one side thereof extends to an associated one of the rails 31a. The condensate collection plate 51 has a net shape such that air may be blown in the vertical direction of the vehicle and condensate is movable to the rails 31a in the width direction of the vehicle. The condensate collection plate 51 is formed such that the extending portion thereof to the rail 31a is lowered such that the condensate is easily movable by gravity. That is, the condensate collection plate 51 is disposed to have a gradient in a direction indicated by the arrow of FIG. 10. Moreover, the rail 31a is formed to have a gradient such that the front end portion thereof is lowered (in a direction indicated by the arrow of FIG. 11) to easily move the condensate to the rail 31a. Since the condensate is moved by the gradient, there is no need for a separate power means for collecting the condensate.

A condensate pipe 52 is disposed between the front end portion of the rail 31a and the upper end portion of the condenser 13. The upper end portion of the condensate pipe 52 is positioned at the front end portion of the rail 31a so that the condensate collected by the condensate collection plate 51 is introduced into the condensate pipe 52. The condensate pipe 52 passes through the roof panel and A-pillar of the vehicle 1 so that the lower end portion of the condensate pipe 52 is positioned at the upper portion of the condenser 13.

Figure 12:
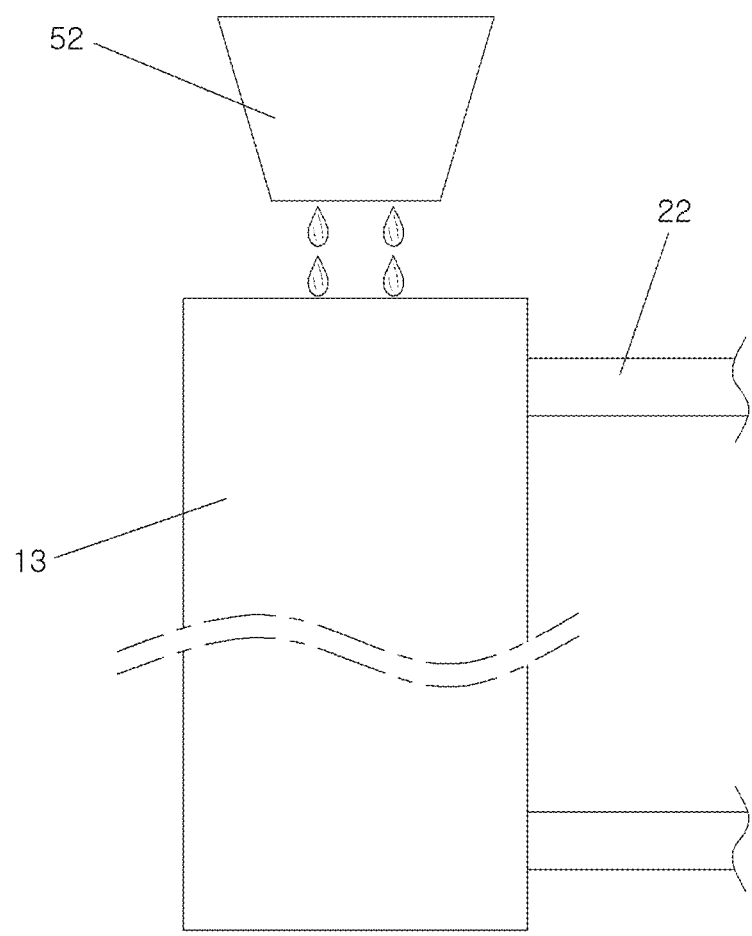
FIG. 12 is a cross-sectional view exemplarily illustrating a state in which condensate drops to a condenser from the condensate collection plate in the roof-type air conditioner for vehicles according to the exemplary embodiment of the present invention.

Meanwhile, the lower end portion of the condensate pipe 52 is open such that the condensate collected in the condensate pipe 52 drops to the upper portion of the condenser 13. The condensate is collected from the evaporator 11 and thus has a low temperature. Therefore, when the condensate drops to the condenser 13 for cooling a refrigerant (see FIG. 12), the cooling of the refrigerant in the condenser 13 is facilitated. Since each of the condensate collection plate 51 and the rail 31a has a gradient and the upper end portion of the condensate pipe 52 is positioned at the front end portion of the rail 31a, the condensate is collected in the upper end portion of the condensate pipe 52 by gravity. By dropping the present collected condensate to the condenser 13 and evaporating it on the surfaces of the tubes and/or cooling fins of the condenser, the cooling efficiency of the condenser 13 is increased by the sensible heat and/or latent heat of the condensate. Thus, it is possible to enhance the cooling performance of the air conditioner and reduce the power required for the compressor 12. Therefore, it is possible to increase the overall efficiency of the air conditioner.

Figure 13:
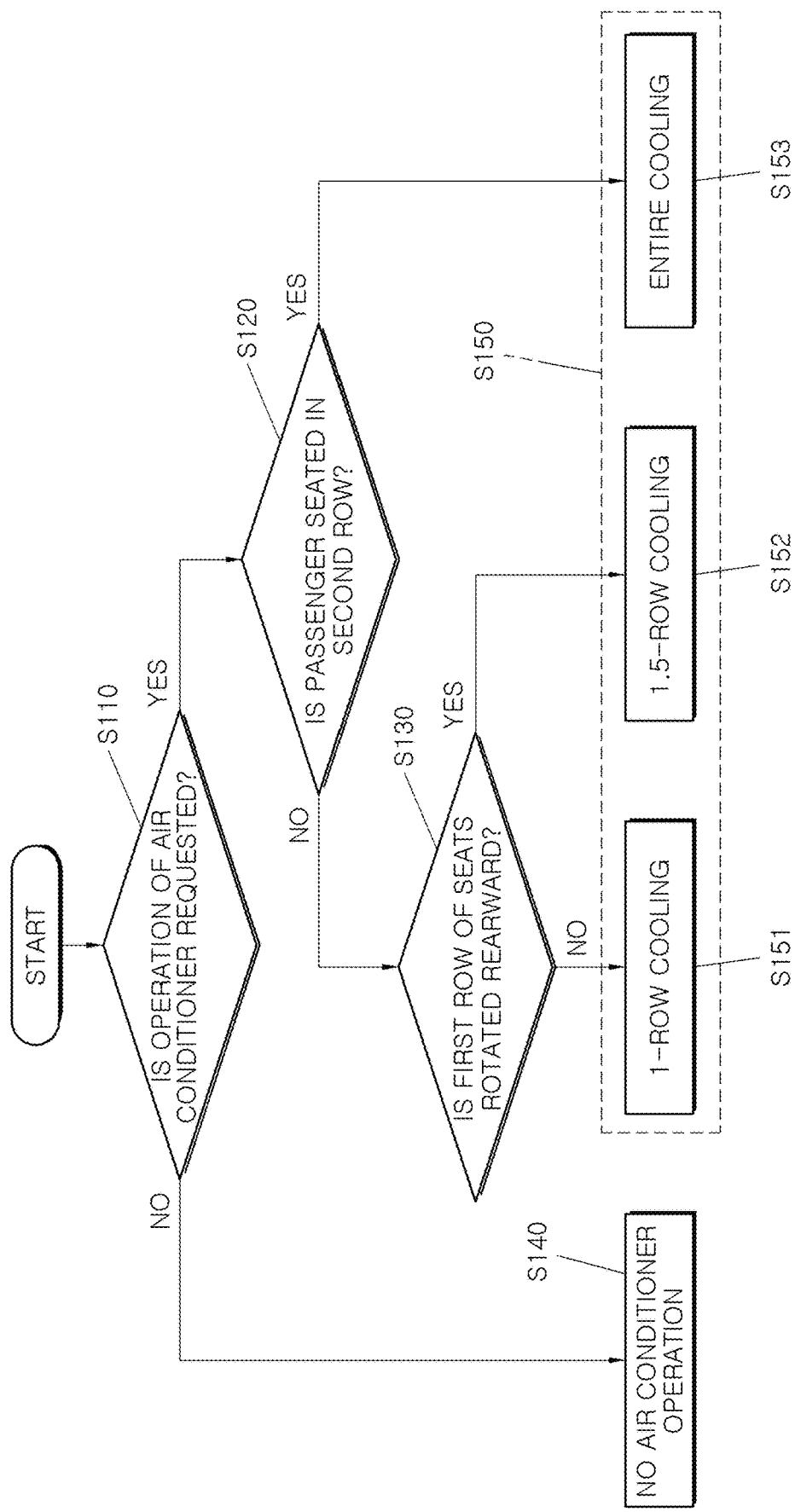
FIG. 13 is a flowchart illustrating a method of controlling a roof-type air conditioner for vehicles according to various exemplary embodiments of the present invention.

FIG. 13 illustrates a method of controlling a roof-type air conditioner by a controller such as ECU for vehicles according another exemplary embodiment of the present invention.

The method of controlling a roof-type air conditioner for vehicles according an exemplary embodiment of the present invention is performed by the above-mentioned roof-type air conditioner having a controller for vehicles, and includes an air conditioner operation request determination step S110 of determining whether a passenger requests the operation of an air conditioner, and an air conditioner operation step S150 of, when the operation of the air conditioner is requested, moving an evaporator 11 according to the position of the passenger and the direction of seats and varying a blown region to cool the internal of a vehicle 1.

In the air conditioner operation request determination step S110, it is determined whether the operation of the vehicle air conditioner is requested. In the air conditioner operation request determination step S110, it is determined that the operation of the air conditioner is requested when the passenger turns on an air conditioner operation switch disposed in the internal of the vehicle or an electric control unit (ECU) of the vehicle operates the air conditioner according to the temperature set by the passenger.

When it is determined that the operation of the air conditioner is not requested in the air conditioner operation request determination step S110, for example when the passenger does not turn on the air conditioner operation switch or the ECU determines that there is no need to cool the internal of the vehicle 1, no air conditioner operation step S140 of operating no air conditioner is performed.

When the passenger turns on the air conditioner operation switch or the ECU determines that there is a need to cool the internal of the vehicle in the air conditioner operation request determination step S110, the air conditioner operation step S150 of operating the air conditioner is performed.

In the air conditioner operation step S150, a selected one of a 1-row cooling step S151, a 1.5-row cooling step S152, and an entire cooling step S153 is performed according to whether the passenger is seated in a second row of seats 6 and/or the direction of rotation of a first row of seats 5. A cooling region is decided by determining whether the passenger is seated in the second row of seats 6 and/or the direction of rotation of the first row of seats 5.

In a seating position determination step S120, it is determined whether the passenger is seated in the second row of seats 6. For example, it is determined whether the passenger is seated in the second row of seats 6 using a seating sensor or the like disposed to the second row of seats 6.

When it is determined that the passenger is seated in the second row of seats 6 in the seating position determination step S120, the entire cooling step S153 is performed.

If it is determined that the passenger is not seated in the second row of seats 6 in the seating position determination step S120, a first-row seat rotation determination step S130 of determining the direction of rotation of the first row of seats 5 is performed. In the first-row seat rotation determination step S130, it is determined whether the first row of seats 5 is directed forward or rearward of the vehicle. At present, the first row of seats 5 of the vehicle is directed forward for a driver to drive the vehicle. However, if an autonomous vehicle will be common in future, the vehicle may travel in the state in which a first row of seats is rotated rearward and passengers in the first row of seats are directed rearward since a driver need not obstinately drive the vehicle. In the state in which the first row of seats 5 is rotated rearward thereof, a region behind the passenger in the first row of seats 5 when that passenger is directed forward of the vehicle 1 has to be cooled. Therefore, it is determined whether the first row of seats 5 is rotated rearward thereof. One of the 1-row cooling step S151 and the 1.5-row cooling step S152 is performed according to whether the first row of seats 5 is rotated rearward thereof.

In the air conditioner operation step S150, a selected one of the 1-row cooling step S151, the 1.5-row cooling step S152, and the entire cooling step S153 is performed according to the determination in the seating position determination step S120 or the first-row seat rotation determination step S130.

Figure 14A:
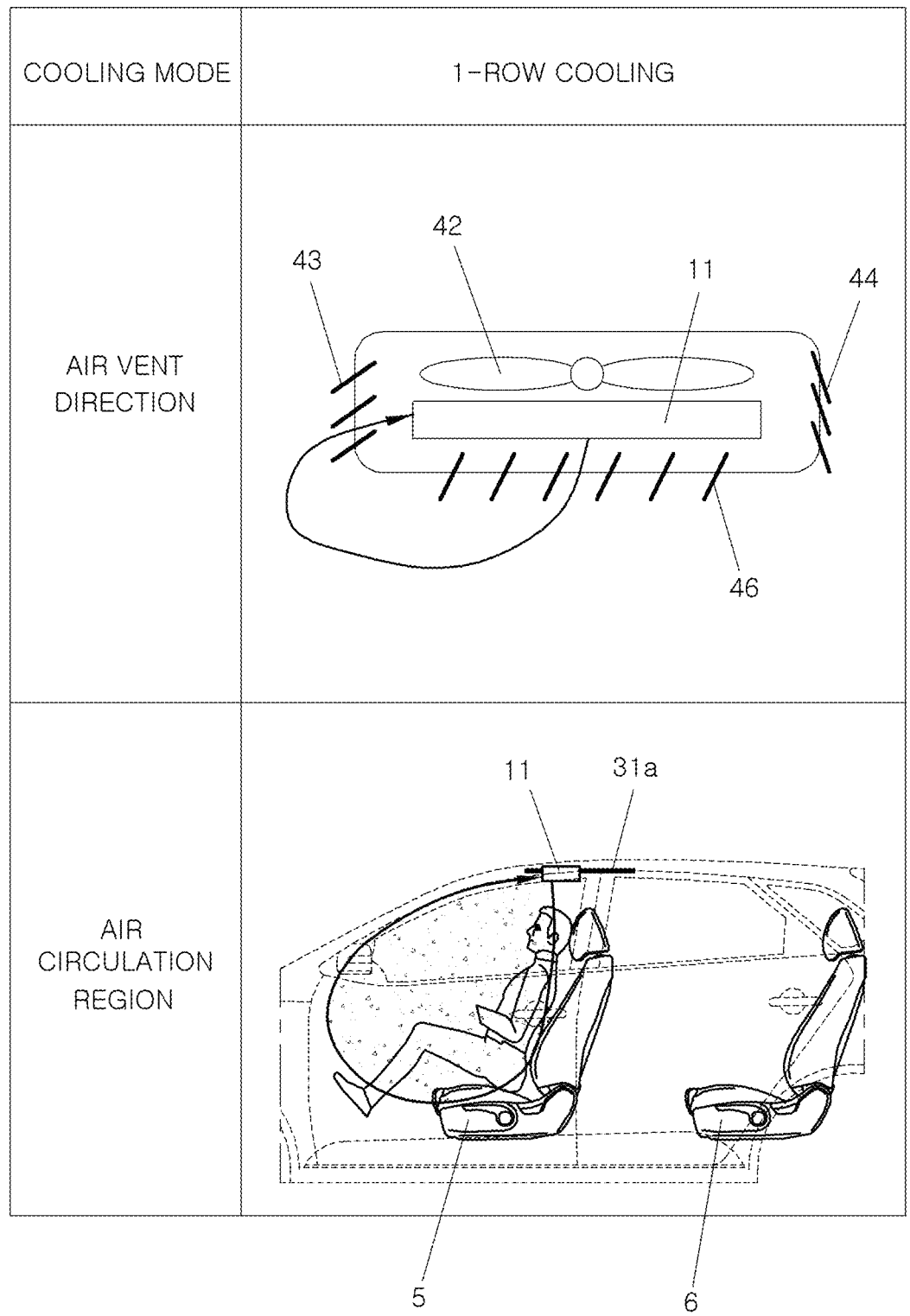
FIG. 14A, FIG. 14. B and FIG. 14C are diagrams schematically illustrating a state for each control mode in the method of controlling a roof-type air conditioner for vehicles according to various exemplary embodiments of the present invention.

The 1-row cooling step S151 is performed in the state in which no passenger is seated in the second row of seats 6 and the first row of seats 5 is directed forward of the vehicle 1. In the 1-row cooling step S151, the front of the first row of seats 5 is cooled in the state in which the evaporator 11 is completely moved forward, namely the evaporator 11 is substantially positioned over the head of the first-row passenger. To the present end, a blower fan 42 and a compressor 12 are operated in the state in which rear vents 44 are closed and lower and front vents 46 and 43 are inclined forward as illustrated in FIG. 14A. In the 1-row cooling step S151, the cold air discharged through the lower vents 46 is circulated in the front region of the first row of seats 5 and then introduced through the front vents 43. Since cold air is intensively supplied to the front region of the first row of seats 5 in the 1-row cooling step S151, it is possible to prevent cold air from unnecessarily circulating to the second row of seats 6. Therefore, it is possible to reduce the power required to operate the air conditioner and fully supply cold air in front of the first row of seats 5.

Figure 14B:
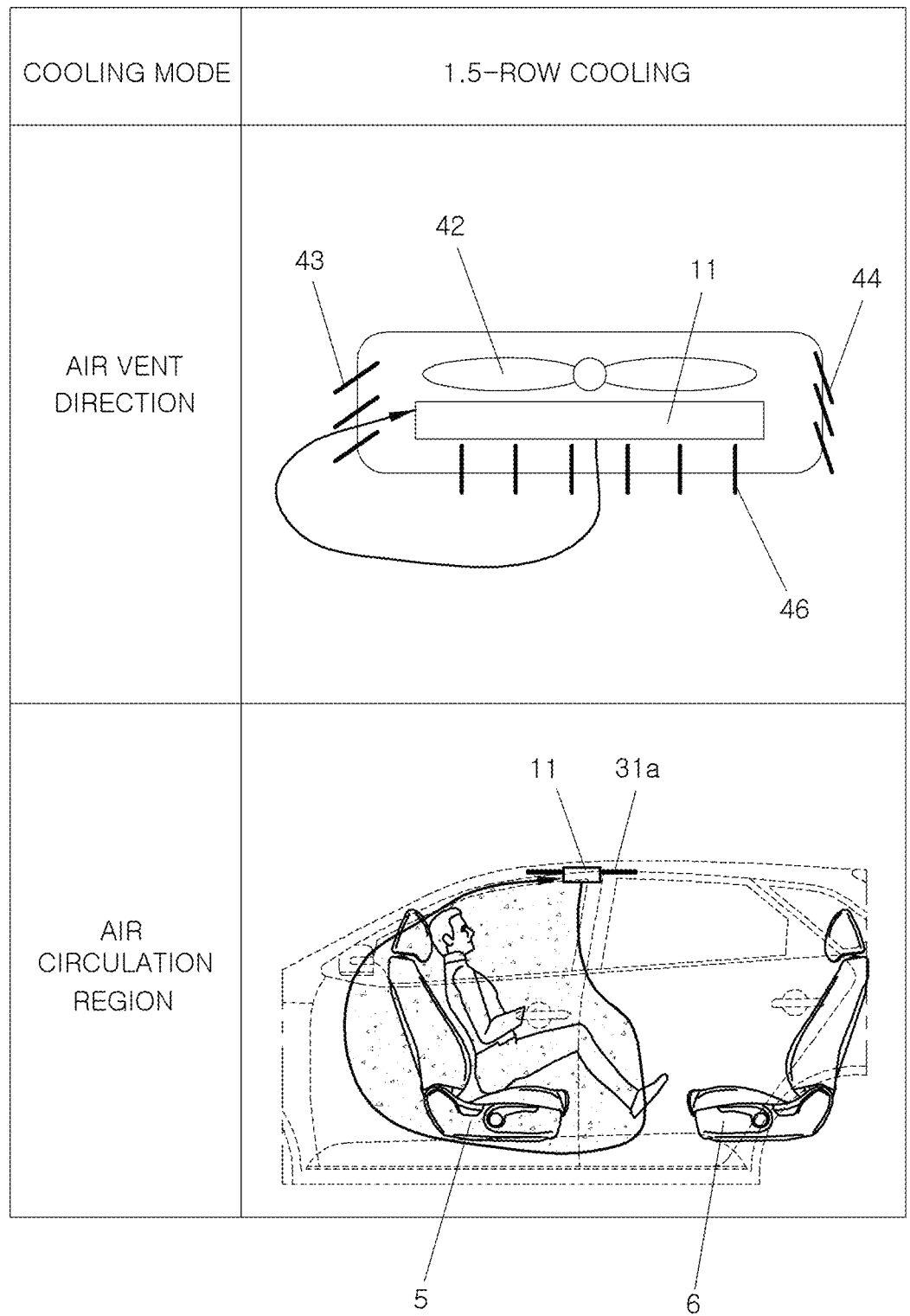

The 1.5-row cooling step S152 is performed in the state in which no passenger is seated in the second row of seats 6 and the first row of seats 5 is directed rearward of the vehicle 1. In the 1.5-row cooling step S152, cooling is performed from the front end portion of the internal of the vehicle 1 to the center portion of the internal of the vehicle 1 in the state in which the evaporator 11 is moved rearward by a fixed distance compared to the 1-row cooling step S151. To the present end, in the 1.5-row cooling step S152, the blower fan 42 and the compressor 12 are operated in the state in which the rear vents 44 are closed, the lower vents 46 are directed directly downward, and the front vents 43 are inclined forward, as illustrated in FIG. 14B. In the 1.5-row cooling step S152, the cold air discharged through the lower vents 46 is circulated in the front region of the first row of seats 5 and then introduced through the front vents 43, and cooling is further expanded to the center portion of the vehicle compared to the 1-row cooling step S151. Since cold air is intensively supplied to the front region of the first row of seats 5 and the center portion of the vehicle, in which the feet of the first-row passenger are positioned, in the 1.5-row cooling step S152, it is possible to prevent coolant from unnecessarily circulating to the second row of seats 6. Therefore, it is possible to improve internal comfort and increase the efficiency of the air conditioner.

Figure 14C:
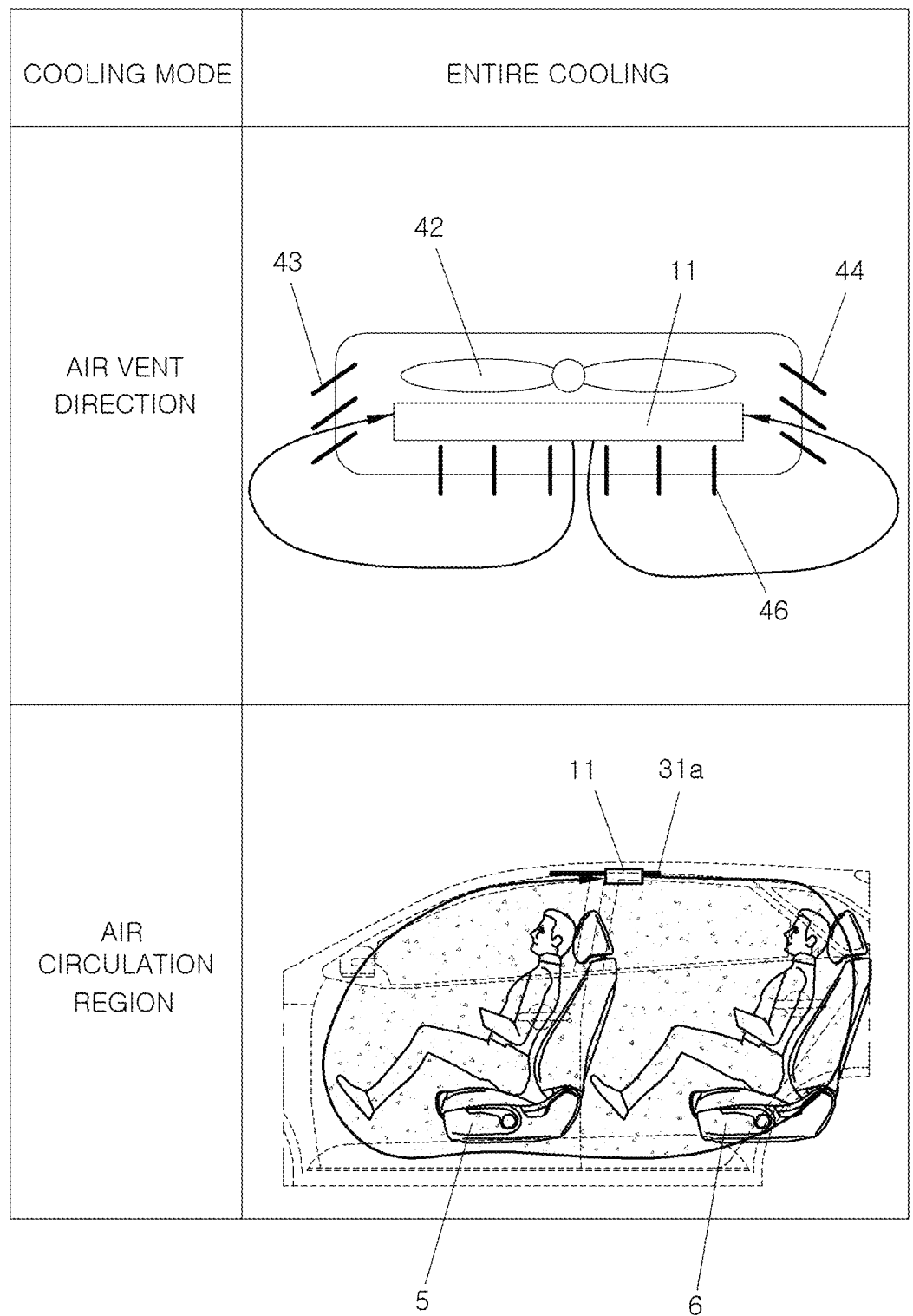

The entire cooling step S153 is performed in the state in which the passenger is seated in the second row of seats 6. The entire cooling step S153 is performed in the state in which the evaporator 11 is moved to the center of the internal of the vehicle. In the entire cooling step S153, the front and rear vents 43 and 44 are inclined (however, they are inclined in opposite directions) and the lower vents 46 are directed directly downward, as illustrated in FIG. 14C. After the air discharged from the evaporator 11 is blown directly downwardly from the center portion of the internal of the vehicle 1, it is circulated through the front and rear of the internal of the vehicle 1 and then introduced through the front and rear vents 43 and 44.

When comparing the position of the evaporator in the 1-row cooling step S151, the 1.5-row cooling step S152, and the entire cooling step S153, the evaporator 11 is completely moved forward of the vehicle in the 1-row cooling step S151, the evaporator 11 is moved rearward by a fixed distance in the 1.5-row cooling step S152 compared to the 1-row cooling step S151, and the evaporator 11 is further moved compared to the 1.5-row cooling step S152 and is positioned at the center of the internal of the vehicle 1 in the entire cooling step S153.

In accordance with the roof-type air conditioner for vehicles and the method of controlling the same according to the exemplary embodiments of the present invention, it is possible to reduce a cooling load since cooling is not performed on an unnecessary space by cooling only a required region using the cooled air discharged in the state in which the evaporator moves in the longitudinal direction of the vehicle according to the number of passengers, the riding position, and the direction of rotation of the first row of seats.

Furthermore, it is possible to smoothly circulate cold air since the air vent is not clogged by the first row of seats even though the seats rotate.

Moreover, it is possible to easily clean the evaporator or the like since the evaporator is exposed with ease. Therefore, it is possible to prevent the propagation of mold and bacteria due to condensate and to prevent the occurrence of odors in the HVAC system.

Since the condensate generated during cooling is collected and used to cool the condenser, it is possible to enhance cooling performance and reduce the power required for the compressor. Therefore, it is possible to increase the overall efficiency of the HVAC system.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A roof-type air conditioner for a vehicle, the roof-type air conditioner comprising:
   an evaporator to discharge cooled air to an internal of the vehicle; and
   a conveying unit to selectively move the evaporator in a longitudinal direction of the vehicle on a ceiling of the vehicle such that the evaporator mounted to the ceiling of the internal of the vehicle is selectively mountable to a region required for cooling,
   wherein the conveying unit includes:
      a frame having rails mounted in the longitudinal direction of the vehicle;
      a drive actuator;
      a plate slidably mounted on the rails to be movable in the longitudinal direction of the vehicle on the rails, the evaporator being mounted on the plate; and
      a conveying device for sliding the plate by operation of the drive actuator, and wherein the conveying device includes:
         a drive gear rotated by the drive actuator; and
         a wire, wherein a first end portion of the wire is connected to the plate and a second end portion of the wire is engaged to the drive gear.

2. The roof-type air conditioner of claim 1, wherein the wire of the conveying device includes:
   a first wire, wherein a first end portion of the first wire is connected to a first portion of the plate and a second end portion of the first wire is engaged to the drive gear; and
   a second wire, wherein a first end portion of the second wire is connected to a second portion of the plate and a second end portion of the second wire is engaged to the drive gear,
   wherein the second end portion of the first wire and the second end portion of the second wire are aligned opposite to each other with respect to the drive gear.

3. The roof-type air conditioner of claim 1,
   wherein the rails of the frame are spaced from each other to face each other;
   wherein the frame has a connection portion connecting end portions of the rails; and
   wherein the drive actuator is mounted to the connection portion.

4. The roof-type air conditioner of claim 3,
   wherein the rails and the connection portion are provided with a guide pipe to guide bending of the wire while the wire passes in the guide pipe.

5. The roof-type air conditioner of claim 1,
   wherein a housing is mounted on the plate to accommodate the evaporator therein; and
   wherein a blower fan is mounted in the housing to blow cooled air into the vehicle.

6. The roof-type air conditioner of claim 5,
   wherein a front vent is mounted to a front of the housing to guide the cooled air forward of the internal of the vehicle;
   wherein a rear vent is mounted to a rear of the housing to guide the cooled air rearward of the internal of the vehicle; and
   wherein a lower vent is mounted at an installation portion of the evaporator on the plate to guide the cooled air in a predetermined direction from the evaporator.

7. The roof-type air conditioner of claim 6,
   wherein the lower vent is mounted to a lower cover detachably mounted to a through-hole formed in the plate.

8. The roof-type air conditioner of claim 1, further including:
   an expansion pipe mounted on one of the rails to connect the evaporator to a compressor and a condenser,
   wherein the expansion pipe is configured such that a length thereof is expanded or contracted telescopically according to a movement of the evaporator while a refrigerant flows into the expansion pipe.

9. The roof-type air conditioner of claim 1,
   wherein a condensate collection plate is mounted under the evaporator to collect condensate generated from the evaporator and guide the condensate to one of the rails.

10. The roof-type air conditioner of claim 9,
    wherein the condensate collection plate has a net shape so that air is blown through the condensate collection plate.

11. The roof-type air conditioner of claim 10,
    wherein a condensate pipe is mounted between a front end portion of at least one of the rails and an upper end portion of a condenser to guide the condensate, collected from the condensate collection plate, in a predetermined direction from the condenser.

* * * * *